Jan. 30, 1923.  1,443,530
C. D. FIRSTER.
LOCK FOR GASOLINE SUPPLY FOR MOTORS.
FILED MAR. 24, 1919.
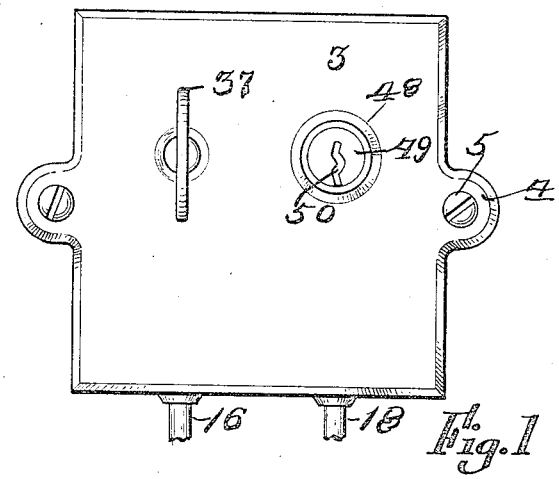
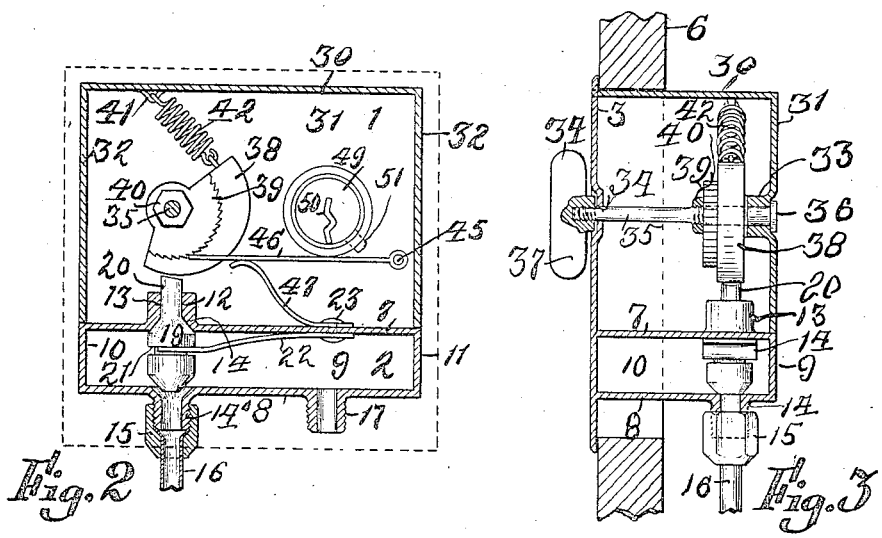
Inventor
Charles Delos Firster,
By C. E. Humphrey
Attorney Patented Jan. 30, 1923.

1,443,530

UNITED STATES PATENT OFFICE.

CHARLES DELOS FIRSTER, OF AKRON, OHIO.

LOCK FOR GASOLINE SUPPLY FOR MOTORS.

Application filed March 24, 1919. Serial No. 284,741.

*To all whom it may concern:*

Be it known that I, CHARLES DELOS FIRSTER, a citizen of the United States, residing at Akron, in the county of Summit and State of Ohio, have invented new and useful Improvements in Locks for Gasoline Supply for Motors, of which the following is a specification.

This invention relates to a device for preventing the theft of automobiles or the unauthorized operation of the same by providing a lock for preventing the flow of gasoline from the source of supply from the tank to the engine and is interposed in the pipe line from the tank to the engine. The invention contemplates a manually controlled valve which when operated shuts off the supply of gasoline to the engine and a lock which releases the valve, the lock being of such construction that only the owner of a proper key can operate the same, it being contemplated it will be in the possession of the owner thereby preventing unauthorized tampering with the car or its operation by persons other than those having a key to release the lock.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1 is a front view of the device.

Figure 2 is a vertical, longitudinal section of the device shown in Figure 1.

Figure 3 is a transverse sectional view.

The device embodies, generally, a box-like structure which is adapted to be positioned on some suitable portion of the car such as the instrument board and within easy reach of the driver. The box-like structure is composed of two compartments, an upper compartment 1 and a lower compartment 2. The lower compartment is formed by means of a front plate or wall 3 provided with ears 4 through which may be passed holding means 5 for securing the entire structure in the instrument board or other suitable portion of a vehicle. In the drawings the reference numeral 6 designates in section, a portion of the instrument board of a vehicle with the device shown in position thereon. The lower compartment of the device is preferably formed integrally with the front plate or wall 3 and embodies an upper wall 7, a lower wall 8, and a rear wall 9 together with lateral walls 10 and 11. The compartment 2 formed of the walls just described is preferably rectangular in shape and is arranged to form a seat for the lower portion of the entire device. The compartment 2 is provided with an opening 12 surrounded by an integral collar 13 in the lower portion of which is a valve seat 14. The lower wall 8 is provided with an integral downwardly turned stem 14' the upper portion of which forms a valve seat and the lower portion is threaded to cooperate with a coupling member 15 carried by an inlet gasoline pipe 16. This wall 8 of the compartment 2 is also provided with an integral downwardly extending hollow boss 17 the exterior of which is threaded to permit the connection therewith of an outlet gasoline pipe 18 which is connected thereto in the usual manner. Shiftably mounted between the valve seat in the stem 14' and the valve seat 14 is a valve 19 the lower portion of which is formed to constitute a closure member for the opening in the stem 14' and the upper portion is provided with a stem 20 which slides in the member 12 and also is provided with a frusto-conically formed portion arranged to engage the valve seat 14 and close the opening through the member 12. The central portion of the valve is provided with an enlarged portion having a circumferential groove 21 in which is seated a spring 22 secured to the under face of the upper wall 7 of the compartment 2 by means of holding means such as a rivet 23. The normal tendency of the spring 22 is to raise the valve 19 and hold same out of contact with the valve seat in the member 14' and permit the flow of gasoline upwardly through the pipe 16, compartment 2 and downwardly through the pipe 18 to the engine.

The plate 3 forms the front wall of the upper compartment 1 and the balance of the compartment is formed by means of an upper wall 30, a rear wall 31 and side walls 32. The rear wall 31 is provided with an opening surrounded by a collar 33 integral with the wall and projecting into the compartment 1. The lower edges of the walls 31 and 32 are arranged to rest upon the upper face of the wall 7 of the lower compartment but are separable therefrom. The front plate 3 has a bearing 34 in alinement with the axis of the opening in the collar 33 and in the opening 33 and the bearing 34 is rotatably mounted a spindle 35. The spindle 35 has a head 36 which bears against the outer face of the wall 31 and the opposite end thereof is threaded to receive a thumb nut 37. The inner portion of which when in position engages the face of the plate 3 and acts to clamp the rear wall of the upper compartment against the rear face of the plate 3 and hold the same in place while permitting rotation of the spindle and its connected mechanism. The axis of this spindle is in vertical alinement with the axis of the valve 19. Mounted on the spindle is a cam 39 so positioned as to engage the upper portion 20 of the valve 39 when rotated in one direction. Preferably formed integrally with the cam 38 is a segment 39 having peripheral ratchet teeth these two being held in position on the spindle by means of a clamping nut 40. The upper portion of the cam 28 is secured to an anchor 41 by means of a spring 42 the normal tendency of which is to keep the cam in its inoperative position. Mounted on a pin 45 extending inwardly from the wall 31 of the upper compartment is a pawl 46 the free end of which is arranged to engage the teeth on the segment 39 and is normally held in engagement therewith by means of the spring 47 which is held in position by the rivet 23 extending through the upper wall 7 of the lower compartment 2. Preferably mounted in the front plate 3 and in the usual mountings employed for locks and indicated by the reference numeral 48 is a cylinder lock 49 provided with a key hole 50 for the reception of a key. The cylinder of the lock 50 has a radially projecting lug 51 so positioned as to engage the upper face of the pawl 46 when rotated and depress the outer end thereof to withdraw it from operative connection with the teeth on the segment 39.

The operation of the device is as follows: During the use of a car employing gasoline or a similar fluid the parts are in the position shown in Figure 2 and the gasoline flows upwardly through the pipe 16, the compartment 2 and outwardly through the pipe 18 to the engine in the ordinary way. When it is desired to lock the car against unauthorized handling or operation the thumb nut 37 is given a partial rotation, clock-wise fashion, causing the cam 39 to shift the valve 19 to its operative position forcing its lower conically-formed end to engage the valve seat in the member 14' and also prevent the passage of gasoline from the pipe 16 to the compartment 2. This movement permits the pawl 46 to ride over the teeth of the segment 39 and at the end of the rotary movement of the shaft 35 a reverse movement of the shaft and cam is rendered impossible by the pawl 46 which is held in position by the spring 47. When it is desired to use the car a proper key is inserted in the key hole 50 and the cylinder of the lock is given a partial rotation, clock-wise fashion, which causes the lug 51 to shift the pawl so as to remove its free end from engagement with the teeth of the segment 39. The removal of the pawl 46 from engagement with teeth of the segment 39 permits the spring 42 to partially rotate the cam 38 so as to release it from engagement with the upper end of the valve 19. This movement of the cam 38 allows the spring 22 to raise the valve 19 out of contact with the valve seat in the member 14' and the flow of gasoline through the pipe 16, compartment 2 and outwardly through the outlet pipe 18 to the engine is resumed.

I claim:

1. A lock for the gasoline supply for motors comprising a casing embodying an upper and a lower compartment, the lower compartment being provided with an inlet and an outlet passage, said lower compartment comprising a receptacle interposed in the gasoline supply line, a communicating opening between said compartments, a valve slidably mounted in said opening, a cam in the upper compartment arranged when actuated to shift said valve, means to operate said cam, a pawl normally engaging said cam so as to control said operating means and a lock arranged when operated to disengage said cam.

2. A lock for the gasoline supply for motors comprising a casing embodying two compartments one of which is provided with both an inlet and an outlet passage, said compartment comprising a receptacle interposed in the gasoline supply line, a valve in said compartment controlling the inlet passage, a manually operable cam in the other compartment arranged when actuated to shift said valve, a ratchet face on said cam, a pawl normally engaging said face so as to prevent said valve from being moved to an open position, and a key controlled means for releasing said pawl.

3. In a device of the class described, including in combination a box like casing adapted to be positioned on the instrument board of an automobile or similar vehicle, said casing having an upper and a lower compartment, the lower compartment having an inlet and an outlet opening in the bottom thereof, the inlet opening being connected with a conduit leading from a fuel supply reservoir and the outlet opening being connected to a conduit leading to the engine on said automobile, so as to permit gasoline to be drawn from said reservoir through said compartment to said engine, a communicating bore between said compartments said bore being in axial alinement with said inlet opening, a valve stem loosely mounted in said bore, a valve on said stem, said valve being adapted to seat in the upper end of said inlet opening when in a downward position and adapted to seat in said bore when in an upward position, means to normally hold said valve in an upward position, a horizontal shaft rotatably mounted in the upper compartment, a cam on said shaft, said cam being arranged to engage said stem and operate said valve, a ratchet face associated with said cam, a pawl normally engaging said face so as to secure said valve against upward movement and locked controlled means to disengage said pawl.

In testimony whereof I have hereunto set my hand.

CHARLES DELOS FIRSTER.